United States Patent
Stiles

(10) Patent No.: US 6,219,692 B1
(45) Date of Patent: Apr. 17, 2001

(54) METHOD AND SYSTEM FOR EFFICIENTLY DISBURSING REQUESTS AMONG A TIERED HIERARCHY OF SERVICE PROVIDERS

(75) Inventor: Ian James Stiles, Salem, UT (US)

(73) Assignee: Stiles Invention, L.L.C., Salem, UT (US)

(*) Notice: Subject to any disclaimer, the term of this patent is extended or adjusted under 35 U.S.C. 154(b) by 0 days.

(21) Appl. No.: 08/831,011

(22) Filed: Mar. 21, 1997

(51) Int. Cl.[7] .................................................. G06F 13/14
(52) U.S. Cl. .............................................................. 709/201
(58) Field of Search .................................... 709/202, 203, 709/201; 713/201; 712/28

(56) References Cited

U.S. PATENT DOCUMENTS

| | | | |
|---|---|---|---|
| 4,451,901 | * 5/1984 | Wolfe et al. | 707/3 |
| 4,672,602 | 6/1987 | Hargrave et al. | 370/360 |
| 4,707,825 | 11/1987 | Amstutz et al. | 370/384 |
| 4,763,317 | 8/1988 | Lehman et al. | 370/358 |
| 4,949,338 | 8/1990 | Albal et al. | 370/462 |
| 5,287,537 | 2/1994 | Newmark et al. | 712/29 |
| 5,323,444 | 6/1994 | Ertz et al. | 379/45 |
| 5,377,191 | 12/1994 | Farrell et al. | 370/401 |
| 5,517,662 | * 5/1996 | Coleman et al. | 709/201 |
| 5,548,779 | 8/1996 | Andert et al. | 709/203 |
| 5,560,005 | 9/1996 | Hoover et al. | 707/10 |
| 5,566,346 | 10/1996 | Andert et al. | 710/8 |
| 5,572,643 | 11/1996 | Judson | 709/218 |
| 5,581,479 | 12/1996 | McLaughlin et al. | 725/145 |
| 5,594,910 | 1/1997 | Filepp et al. | 712/28 |
| 5,604,682 | 2/1997 | McLaughlin et al. | 709/219 |
| 5,608,869 | 3/1997 | Hamstra et al. | 709/250 |
| 5,692,182 | * 11/1997 | Desai et al. | 707/10 |
| 5,758,069 | * 5/1998 | Olsen | 713/201 |
| 5,790,789 | * 8/1998 | Suarez | 709/202 |
| 5,850,518 | * 12/1998 | Northrup | 709/203 |
| 6,038,594 | * 3/2000 | Puente et al. | 709/217 |

* cited by examiner

Primary Examiner—Kenneth R. Coulter
(74) Attorney, Agent, or Firm—Lloyd W. Sadler

(57) ABSTRACT

A system and method for dispatching computer system service requests to multiple service providers in a tiered-parallel fashion such that a request can be satisfied in the shortest time possible by the computer, or module, most available to provide valid responses is described. The method is designed to permit a hierarchal ordering, by tiers, of preferred service providers, where the dispatches are performed in parallel as to providers on the same tier and in serial as to providers on subsequent tiers. This invention improves the speed and reliability of response to service requests for data, or objects, across a computer system network with one or more computer processing units.

2 Claims, 4 Drawing Sheets

METHOD AND SYSTEM FOR EFFICIENTLY DISBURSING REQUESTS AMONG A TIERED HIERARCHY OF SERVICE PROVIDERS

SOFTWARE APPENDIX

This specification includes a software appendix which is intended to be a part of the disclosure herein. The software appendix includes 14 pages of software source code, used in the implementation of one preferred embodiment of the invention. Applicant intends that this software appendix be included herein as part of the specification of this invention.

BACKGROUND OF THE INVENTION

1. Field of the Invention

This invention relates generally to computer systems, particularly computer systems which access or are accessible by other computer system, and to methods of disbursing service requests to multiple service provider computer systems. Specifically this invention relates to methods for disbursing computer system service requests to multiple service provider computer systems in a tiered-parallel fashion such that a request can be satisfied in the shortest time possible. More specifically this invention relates to methods and technology for spawning a service provider request thread for each service provider listed on a configured tier or level and making the request for service in parallel for each service provider on each tier or level. Also, this invention provides the means for accommodating the situation when certain service providers are preferred over others for processing requests. A hierarchy of service providers is provided by defining multiple tiers for the prioritizing of service providers. All service providers in the first tier are requested in parallel, only after all providers of the first tier have failed is the second tier tried. This approach continues with successive tiers until either the request is serviced or all providers have failed the request. When used in combination with remotely accessible digital computers, this invention serves to provide a means for improving service request processing time across networks of connected digital computers, such as but not exclusively Internet. For the purposes of this patent application, computer system is defined as one or more computational devices, employing processing units and methods of communicating data between such processing units. Such a computer system may be a single "stand-alone" computational device or a "network" of more than one computational device connected over electrical lines, optical signals, phone lines or any other method well known in the art as a method of communicating between computer systems.

Providing a method for disbursing computer service requests to multiple service providers in a tiered parallel fashion is a useful technique to improving the response time of networked computer service requests without sacrificing the ability to designate a preference of a particular service provider or set of service.

2. Description of Related Art

Various approaches are well known for sending service requests to computers across a network of computer devices. These approaches generally consist of a central registry with multiple service providers sequentially receiving requests and waiting for responses. Examples of such approaches are embodied in network clients like Novell's DOS and Windows client known as VLMs and Novell's Windows95 client known as Client32. For example, these clients attempt first Directory Service requests on the NDS (Novell Directory Service) protocol and upon failure, attempt the same request on Novell's Bindery service. Unlike this approach, the present invention uses a parallel request structure to attempt to most quickly find the most preferred provider to service a request.

Another somewhat related approach involves systems where a series of requests are sent out to multiple processors, of essentially identical capability but with differing processing loads, in parallel. Unlike this approach, the present invention is designed both to permit a sequencing of tiers of preferred service providers and to work with very different service providers.

Other approaches described in the related art include the following: a telemetry system for connecting a number of subscribers to a provider of data services; a method of assigning a first control processor to the service set of a second control processor in a distributed-control communications environment; a digital communication network having a number of service areas each with a central node, each of which is connected to a number of remote nodes; an architecture for a switching node of a communications network having multiple layers; a distributed computer system having a number of digital computers interconnected by a bus, wherein commands are either processed by an individual computer system or passed along to the next computer system on the bus; an emergency response service system with three types of destinations to which emergency calls may be routed; a network communications system which passes messages between gateways via a message handling system, a method and system for providing services in an object oriented system, an object-based relational distributed database system and method of transforming data stored in a number of remote user databases into a homogeneous user database structure; an object-oriented input/output system providing an interface between clients of the input/output system and peripheral devices; a method of browsing the Worldwide Web of the Internet using an HTML-compliant client supporting a graphical user interface and a browser; methods and apparatuses for communicating data from a central station to a remote station over a communications path; a distributed processing, interactive computer network and method of operation; and an interface system for transferring information between a local area network and a system memory associated with a station attached to the network.

This invention provides several important advantages over the prior approaches, including but not limited exclusively to: the ability to access service providers in parallel; the ability to work with various types of service providers, and the ability to maintain a hierarchy of preferred service providers. Furthermore, this invention is designed to meet the unique requirements of computer services, software and/or developers in distributing service requests to multiple computer system service providers connected remote to one another over generally large (Internet or the like) networks.

For general background material, the reader is directed to U.S. Pat. Nos. 4,672,602, 4,707,825, 4,763,317, 4,949,338, 5,287,537, 5,323,444, 5,377,191, 5,548,779, 5,560,005, 5,566,346, 5,572,643, 5,581,479, 5,594,910, 5,604,682, and 5,608,869 each of which is hereby incorporated by reference in its entirety for the material disclosed therein.

SUMMARY OF THE INVENTION

It is desirable to provide a method and system for improving the access response time for requests made to multiple networked computer system service providers. Furthermore, it is desirable to provide a method which improves such access response by distributing requests in a parallel fashion. It also desirable to have a method and system for making parallel distributed requests while providing a method of preference, by organizing the multiple computer service providers in a hierarchy of tiers of service providers, wherein the distribution of requests between successive tiers is performed in a serial fashion.

Accordingly, it is the primary object of this invention to provide a multi-threaded query capability in a single or multiple processor computer network environment.

Another object of this invention is to improve query response time by spawning multiple queries simultaneously.

A further objective of this invention is to provide a method for taking advantage of the performance enhancing capabilities of having multiple processors in a computer network, by distributing service requests across the network in a parallel fashion.

A still further object of this invention is to provide a method of prioritizing the processors in a computer network, providing that preferred processor tier be queried first and the less preferred processor tiers be queried later.

These and other objects of this invention, which will be clear to those of ordinary skill in the art upon review of this patent specification and claims, are achieved by an invention which distributes computer system requests to one or more processors across a computer network, wherein the processors are categorized into tiers of preference and wherein all processors in each tier is queried in parallel, while the tiers of preference are queried in serial, with the all processors of a preferred tier queried before any processors of a less preferred tier is queried.

DETAILED DESCRIPTION OF THE INVENTION

This invention provides a method and system for dispatching computer system service requests to multiple service providers over a computer network in parallel over a tiered hierarchy of preferred service providers. Computer system is defined by the applicant to include one or more computational devices capable of executing prearranged instructions wherein said computational devices include one or more processing units. The method of the invention acts in association with existing applications on the computer and is "called" from other computer applications. When the invention is properly used a service request is dispatched to a multiple of computer service providers in parallel. Each service provider then attempts to service the request in parallel and without any interaction with other providers. The first service provider to return a valid response, has serviced the request. If no service providers on the dispatched tier of preferred service providers can satisfy the request, the process is repeated for the next lower tier. This process continues until either the request has been serviced or all of the providers on each and every tier has denied the request.

Figure 1:
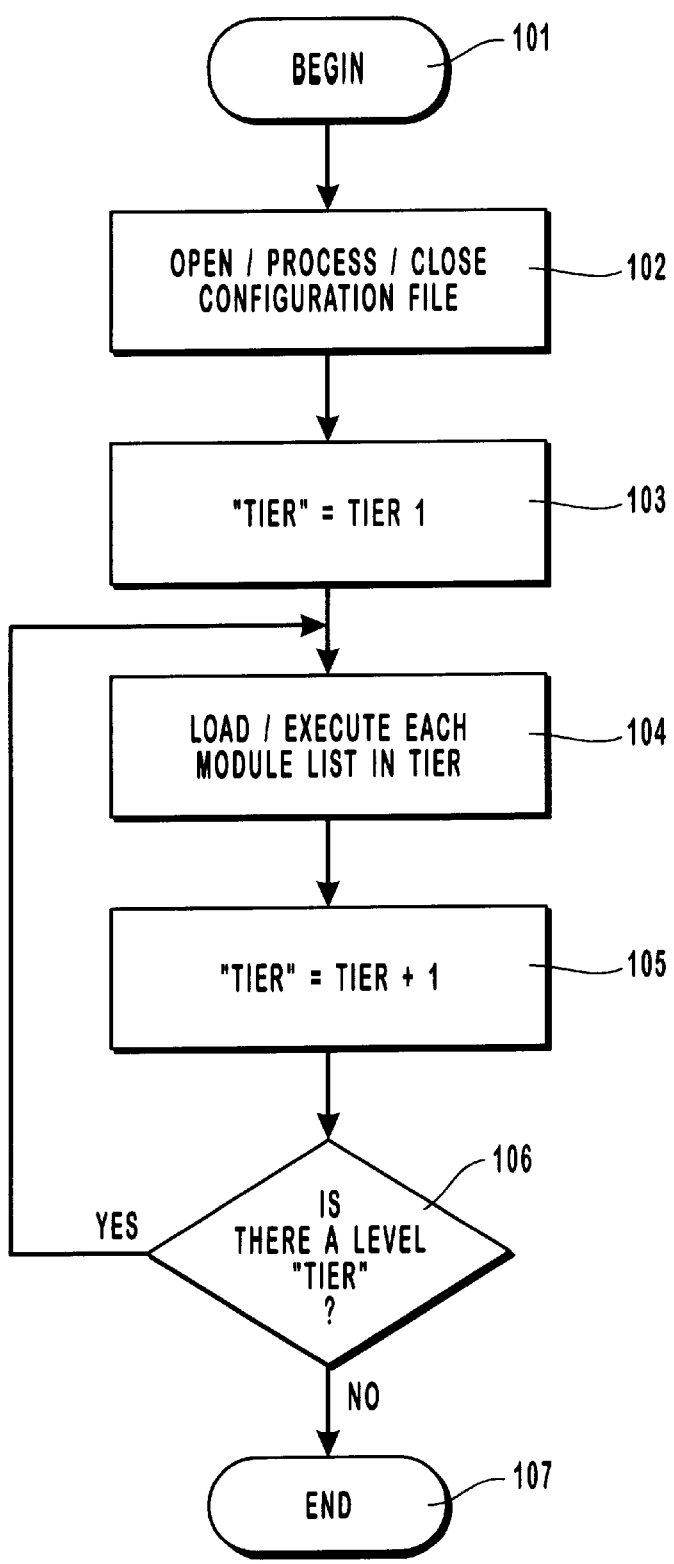
FIG. 1 depicts top level flow chart of the process of this invention.

FIG. 1 shows the preferred embodiment of the method or process of the invention. The invention, in its best mode of operation, is coded in the Java computer language and is performed using the TreeFactory module, the TieredRequest module, the NCPTreeFactory module, the LocalTreeFactory module, the LDAPTreeFactory module, the NFSTreeFactory module, the NFSTreeFactory module, and the WebTreeFactory module. The steps of this invention involve an application resolving a path to a Leaf object. The TreeFactory acts as a multiplexer or dispatcher of requests. A thread is spawned for each service provider in a tier by constructing a TieredRequest object. Each tier is attempted to see if it can respond, until the object is found or until all service providers have attempted, and failed, to service the request. The software embodiment of the preferred embodiment of the invention is organized as follows.

| Application | -> TreeFactory | :getObject ("domain.com/path/file"); |
|---|---|---|
| TreeFactory | -> TieredRequest | :construct (NCPTreeFactory, path,response); |
| TreeFactory | -> TieredRequest | :construct (LocalTreeFactory, path,response); |
| TieredRequest | -> NCPTreeFactory | :retrieve (path) |
| TieredRequest | -> LocalTreeFactory | :retrieve (path) |
| TieredRequest | <- NCPTreeFactory | :null |
| TieredRequest | <- LocalTreeFactory | :null |
| TreeFactory | -> TieredRequest | :construct (LDAPTreeFactory, path,response); |
| TreeFactory | -> TieredRequest | :construct (NFSTreeFactory, path,response); |
| TieredRequest | -> LDAPTreeFactory | :retrieve (path); |
| TieredRequest | -> NFSTreeFactory | :retrieve (path); |
| TieredRequest | <- LDAPTreeFactory | :null |
| TieredRequest | <- NFSTreeFactory | :null |
| TreeFactory | -> TieredRequest | :construct (WebTreeFactory, path,response); |
| TieredRequest | -> WebTreeFactory | :retrieve (path); |
| TieredRequest | <- WebTreeFactory | :Leaf |
| TreeFactory | <- TieredRequest | :Leaf |
| Application | <- TreeFactory | :Leaf |

An alternative embodiment of the structure of this invention would make the request to all service providers simultaneously, using the tier configuration only for determining which provider's result would be used if multiple processors service the same object. In the event that two providers return the same object, the one that is higher in the hierarchy or the tier levels would be used in priority to the other. In the event of two providers in the same tier responding, which ever one responded first would be used.

Returning to FIG. 1, In its preferred embodiment the invention is practiced by first being begun 101, which step includes loading the invention into computer memory so that automatic interaction with requesting applications can occur. Next, the process of the invention is initialized by opening, processing, and closing the configuration file 102 of the computer system. The "Tier" variable is set to initialized 103 by being set to one. The Each module listed in the tier "Tier" (in the first instance Tier 1) is loaded and executed 104. In the preferred embodiment of the invention this code is located in TreeFactory.loadTiero routine. Next, the tier number, "Tier," is incremented (in the first instance to Tier 2) 105. The tier number is checked to see if it exceeds the total number of tiers available 106. If it does not exceed the number of tiers available then the process returns to step 104 of loading and executing each module listed in the tier "Tier". If the value of "Tier" exceeds the total number of tiers available, then the process ends.

Figure 2:
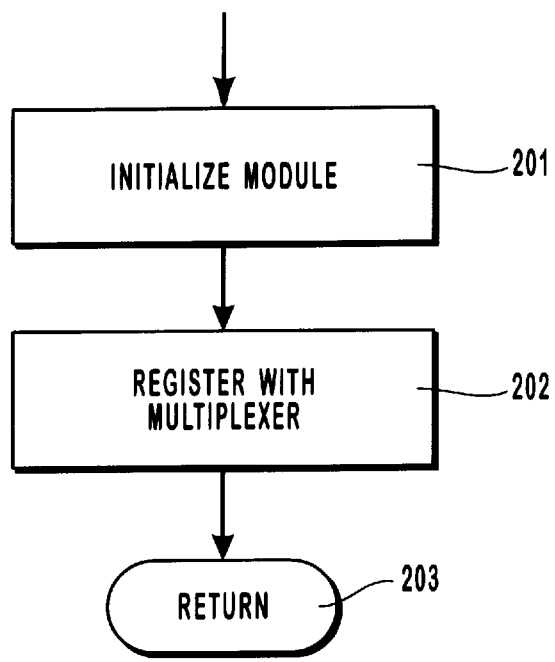
FIG. 2 depicts a detailed flow chart of the "Load and Execute Module" step of the process of the invention.

FIG. 2 shows further detail as to the preferred embodiment of the "Load and Execute Module" step of the invention, as shown in FIG. 1, step 104. First, the module is initialized 201 for execution. Next, the module is registered with the multiplexer 202 that is the heart of the invention. Following the registration of the module, this routine returns 202 to step 105 of FIG. 1.

Figure 3:
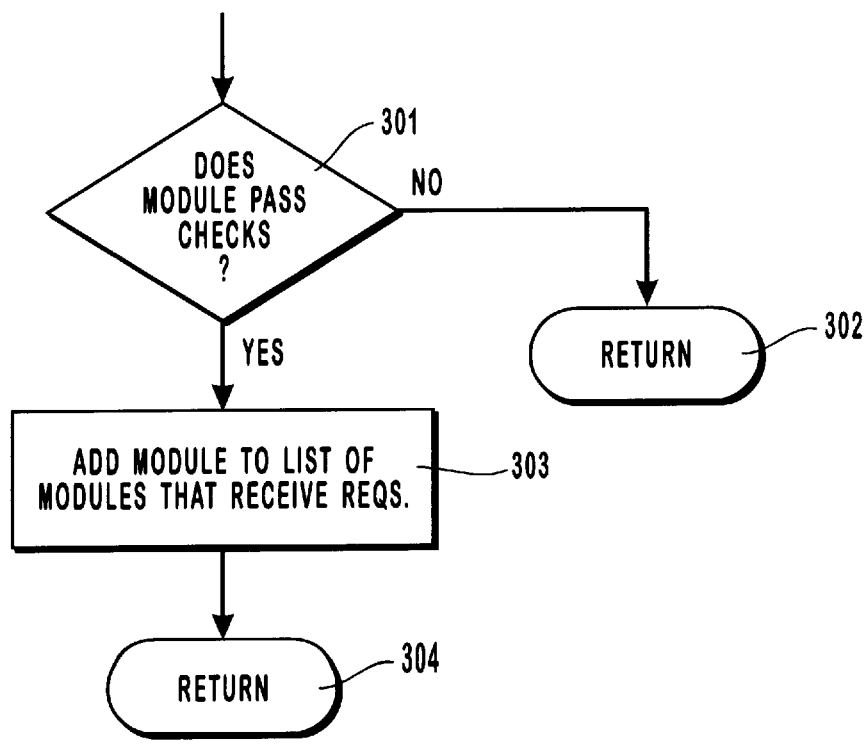
FIG. 3 depicts a detailed flow chart of the "Register with Multiplexer" step of the process of the invention.

FIG. 3 shows the detail of the preferred embodiment of the "Register with Multiplexer" step of the invention, as shown in FIG. 2, step 202. First, a check is made as to whether the module passes the tests, or checks to be requested 301. In the preferred embodiment of the invention this check step 301 is performed by code located in TreeFactory.registerTreeFactoryClass( ) routine. If the check 202 indicates that the module does not pass the process returns 302 to step 202 of the invention. Alternatively, if the check 202 indicates that the module passes, the module is added 303 to the list of modules that will receive requests. Then, the process returns to step 202 of the process.

Figure 4:
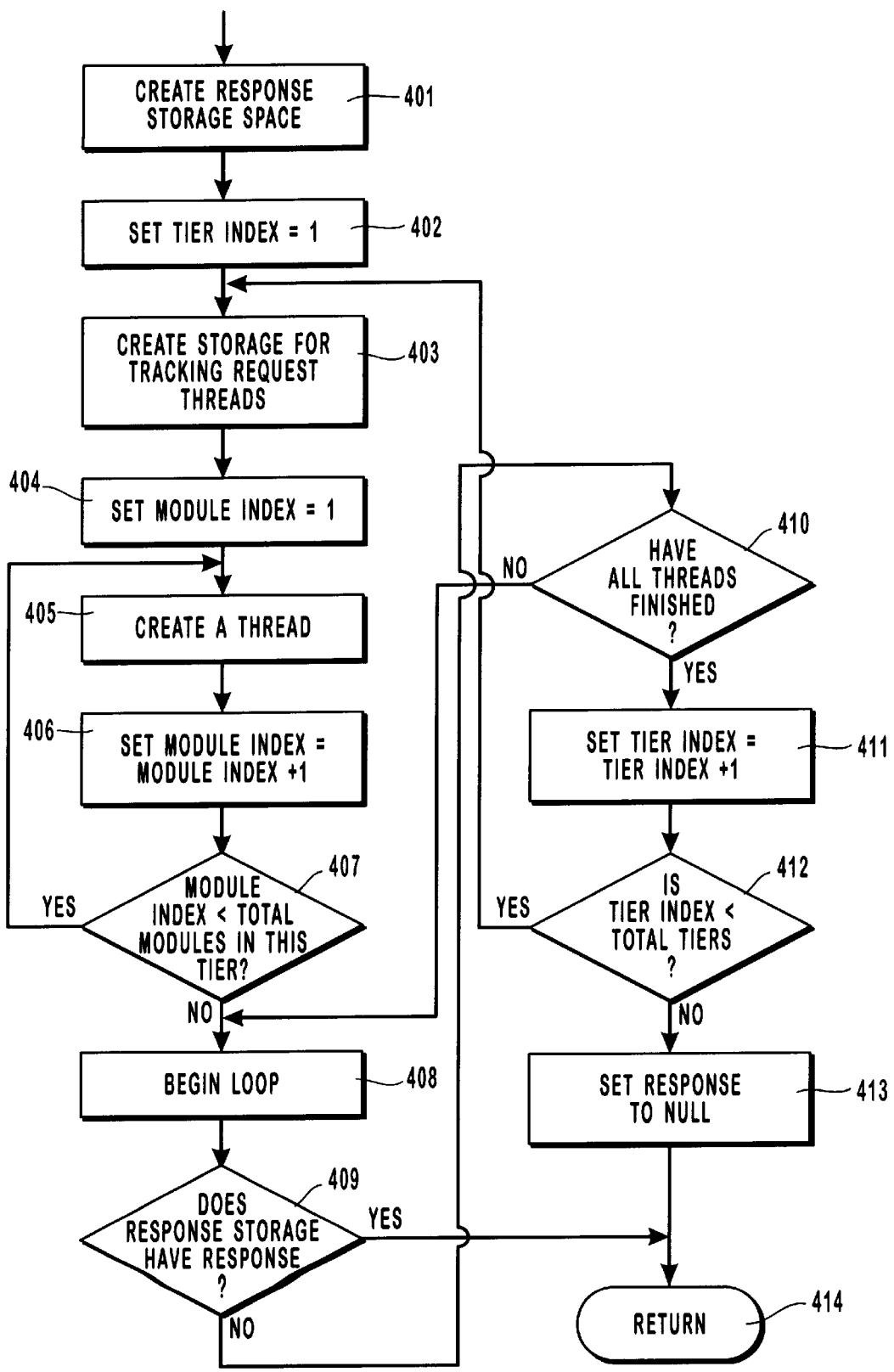
FIG. 4 depicts a detailed flow chart of the "Add Module to List" step of the process of the invention.

FIG. 4 shows the detail of the preferred embodiment of the "Add Module to List" step of the process of the invention, as shown in FIG. 3, step 303. Response storage space is created 401 to provide a place for asynchronous answers, or responses, to be stored. Service objects are added to this storage as responses are received, allowing the first response to be the first in the dedicated storage. Next, the TierIndex is set 402 to the value 1, to initialize the TierIndex loop. Storage is created, or allocated, for tracking request threads 403. The ModuleIndex is set 404 to the value of one, to initialize the ModuleIndex loop. A thread is created 405. This step 405 includes creating a thread, passing module references, requests and a reference to response storage created in step 401. The ModuleIndex value is then incremented 406. A test is performed to determine if the ModuleIndex continues to be less than the total number of modules in this particular tier 407. If the ModuleIndex is less than the total number of modules then step 405 create a thread is repeated. If the ModuleIndex is not less than the total number of modules, then the response loop is begun 408. A test is made as to whether the response storage has a response stored 409. If so, the response is returned 414. If no response has been stored, then the inquiry is made as to whether all threads have finished 410. If all threads have not finished the process returns to the begin loop step 408. If all threads have finished, then the TierIndex is incremented 411 and a test is made as to whether the current TierIndex is less than the total number of tiers 412. If the current TierIndex is less than the total number of tiers then the process returns to step 403 to create storage for tracking the request threads. Alternatively, if the current TierIndex is not less than the total number of tiers the response is set to null 413 and the process returns to step 304.

Figure 5:
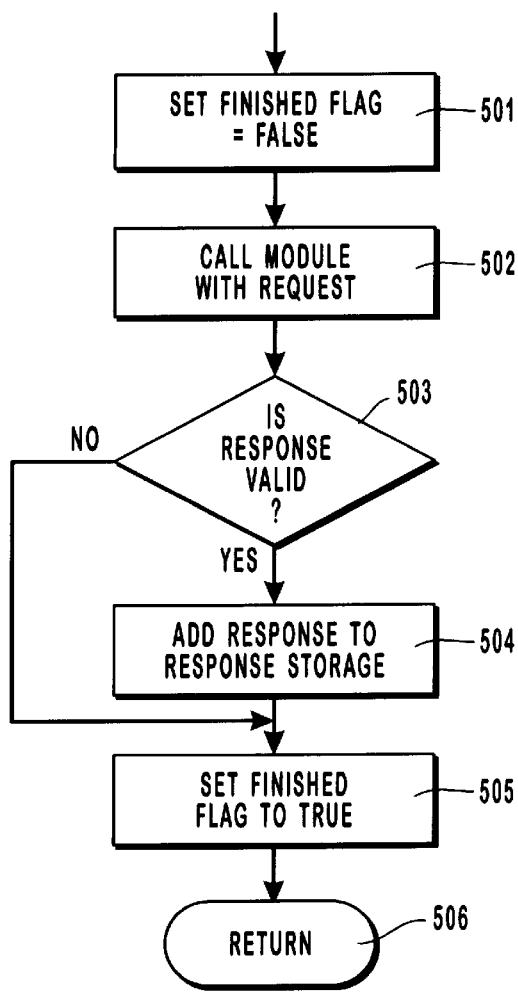
FIG. 5 depicts a detailed flow chart of the "Create a Thread" step of the process of the invention.

FIG. 5 shows the detail of the preferred embodiment of the invention for the "Create a Thread" step of the invention, shown in FIG. 4 step 405. Initially, the FinishedFlag is set to False 501. This step, in the preferred embodiment of the invention is located in the TieredRequest.jave routine. Next, the module is called with the request 502. A test is made as to whether a valid response has been received 503, if not the FinishedFlag is set to True 505 and the process returns to step 406 of the process of the invention. If, however, the response if found to be valid, then the response is added to the response storage 504, created in step 401, the FinishedFlag is set to True 505 and the process of the invention returns 506 to step 406.

Figure 6:
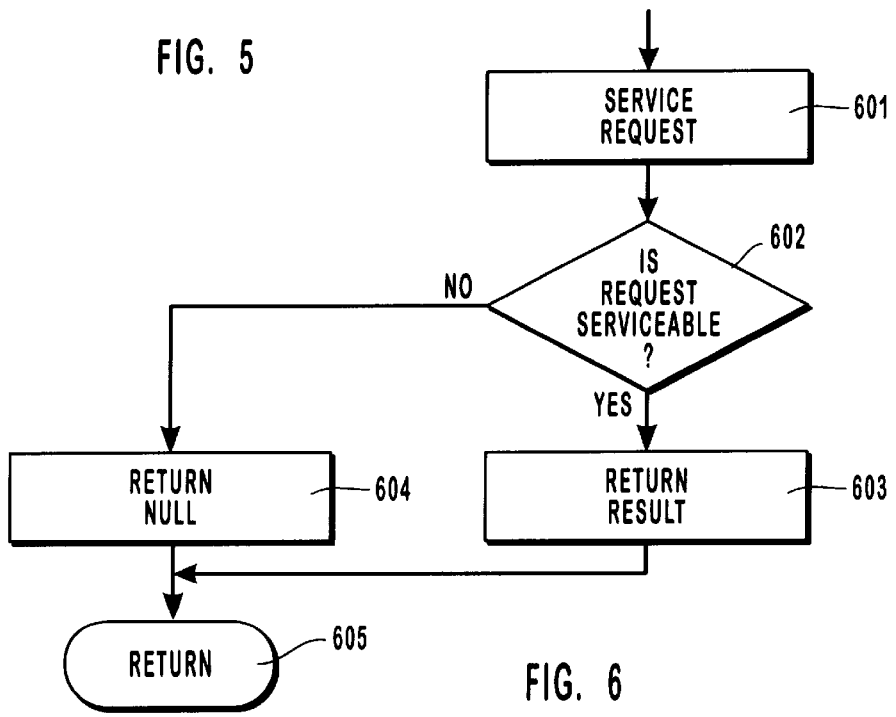
FIG. 6 depicts a detailed flow chart of the "Call Module with Request" step of the process of the invention.

FIG. 6 shows the detail of the preferred embodiment of the invention for the "Call Module with Request" step of the process of the invention, of FIG. 5, step 502. This detail begins with the receipt of a service request 601. The received service request is then checked to see if it is serviceable 602, if so, the service request result is returned 603 and the process of the invention is returned to step 503 of the invention. Alternatively, if the received service request is not serviceable, then a "null" value is returned 604 and the process of the invention returns to step 503.

It should be noted that the method and system of this invention may, and in the best mode of operation is, implemented in one or more digital computer systems. Typically such computer systems will have a central processing unit, dynamic memory, static memory, mass storage, a command input mechanism (such as a keyboard, mouse, trackball or other equivalent input device), a display mechanism (such as a monitor, flat screen display or other equivalent output device), a hardcopy device (such as a printer, plotter or other equivalent hardcopy device). Variations of such a computer system can be used as well. Such variations may include: laptop computers, personal computers, minicomputers, mainframe computers, special purpose servers and digital controllers. The computer system will typically run under the software control of an operating system and a program capable of performing the method of the invention. The method of the invention will, in its current best mode, be implemented in the Java programming language. However, it could conceivably be performed in other programming languages, including but not limited to FORTRAN, PASCAL, C, and C++,or any other suitable programming language. The computer system may be part of a local area network, and/or a wide area network, may operate essentially as a standalone computer or primarily as an access port to the Internet.

It is to be understood that the above described embodiments of the invention are merely illustrative of numerous and varied other embodiments which may constitute applications of the principles of the invention. Such other embodiments may be readily devised by those skilled int he art without departing from the spirit or scope of this invention and it is the inventor's intent that such other embodiments of the invention be deemed to be within the scope of this invention.

I claim:

1. A method for supporting multiple query threads between software modules executing on a computer network, comprising:

(A) an application program spawning queries, wherein said queries are spawned in a tiered-parallel fashion and wherein said tiers of spawned queries are hierarchally ordered;

(B) a multiplexer receiving said spawned queries from said application program and transmitting said queries; and (C) a module receiving said queries from said queries from said multiplexer for processing.

2. A process for supporting multiple query threads between software modules executing on a computer system comprising the steps of:

(A) receiving a request for service on a computer system;

(B) creating a hierarchal list of service providers, wherein said hierarchal list is composed of tiers of service providers;
(C) ordering said tiers of service providers by preference for dispatch of said service request;
(D) loading a module from a said service provider from said created hierarchal list;
(E) checking if said loaded module passes serviceability tests;
(F) adding said loaded module to a list of modules that are permitted to receive requests;
(G) creating a request thread;
(H) testing for a valid response from said request thread; and
(I) returning said valid response from said requested thread if said response was valid.

* * * * *